United States Patent

Smisson et al.

[11] Patent Number: 5,188,238
[45] Date of Patent: Feb. 23, 1993

[54] SEPARATOR FOR SEPARATING SOLIDS COMPONENTS OF LIQUID MIXTURES AND METHOD OF USING THE SAME

[75] Inventors: Robert P. M. Smisson; Timothy J. Lamb, both of Clevedon, United Kingdom

[73] Assignee: Hydro International Limited, United Kingdom

[21] Appl. No.: 807,731

[22] Filed: Dec. 16, 1991

Related U.S. Application Data

[63] Continuation of Ser. No. 541,015, Jun. 20, 1990, abandoned.

[30] Foreign Application Priority Data

Jun. 21, 1989 [GB] United Kingdom ............... 8914215

[51] Int. Cl.$^5$ ............................................. B04C 5/102
[52] U.S. Cl. ................................. 209/211; 209/155; 210/512.1
[58] Field of Search ............... 209/211, 208, 210, 155; 210/521.1, 619, 788, 801

[56] References Cited

U.S. PATENT DOCUMENTS

| | | | |
|---|---|---|---|
| 1,537,424 | 5/1925 | Elms | 209/210 |
| 2,273,271 | 2/1942 | Kerns | 209/211 |
| 2,364,405 | 12/1944 | Trimbey et al. | |
| 3,480,543 | 11/1969 | Hildebrand | |
| 3,965,013 | 6/1976 | Jackson | 210/519 |
| 4,106,038 | 8/1978 | Weis | |
| 4,146,468 | 3/1979 | Wilson | 209/211 |
| 4,146,471 | 3/1979 | Wyness | |
| 4,451,366 | 5/1984 | Smisson | 210/512.1 X |
| 4,517,091 | 5/1985 | Yamanaka et al. | 209/211 X |
| 4,519,848 | 5/1985 | Underwood | |
| 4,532,034 | 7/1985 | Hans et al. | |
| 4,539,103 | 9/1985 | Hollingsworth | 209/211 X |
| 4,576,720 | 3/1986 | Mandt | |
| 4,759,854 | 7/1988 | Wilson | 209/211 X |
| 4,807,761 | 2/1989 | Hollingsworth | 209/211 X |
| 4,822,482 | 4/1989 | Hollingsworth | 209/211 X |

FOREIGN PATENT DOCUMENTS

| | | |
|---|---|---|
| 0162650 | 11/1985 | European Pat. Off. |
| 0168538 | 1/1986 | European Pat. Off. |
| 3105081 | 9/1982 | Fed. Rep. of Germany |
| 3529760 | 2/1987 | Fed. Rep. of Germany |
| 2082941 | 3/1982 | United Kingdom |
| 2148744 | 6/1985 | United Kingdom |
| 2152401 | 8/1985 | United Kingdom |
| 2153261 | 8/1985 | United Kingdom |
| 2153261 | 8/1985 | United Kingdom ............... 210/788 |
| 2158741 | 11/1985 | United Kingdom |
| 2160445 | 12/1985 | United Kingdom |
| 2189413 | 10/1987 | United Kingdom |
| 2205512 | 12/1988 | United Kingdom |
| 2213400 | 8/1989 | United Kingdom |

*Primary Examiner*—Donald T. Hajec
*Attorney, Agent, or Firm*—Larson & Taylor

[57] ABSTRACT

There is disclosed a separation vessel which is defined by a cylindrical wall (2) and a base (38), there being a solids collection region (12) centrally disposed of the base (38), an outlet (8) disposed in an upper region of the vessel, and a flow modifying member (14) positioned adjacent the base (38), the arrangement of the vessel being such that liquid carrying particulate material may flow upwardly to the top of the vessel toward the outlet (8) in a substantially axial direction. Also disclosed is a method of separating components of a liquid mixture from each other and a method of classifying a particulate material.

5 Claims, 4 Drawing Sheets

SEPARATOR FOR SEPARATING SOLIDS COMPONENTS OF LIQUID MIXTURES AND METHOD OF USING THE SAME

This application is a continuation of application Ser. No. 07/541,015 filed Jun. 20, 1990, now abandoned.

FIELD OF THE INVENTION

This invention relates to A device for separating from each other components of a liquid mixture, dependent upon the settlement velocities of the components.

BACKGROUND OF THE INVENTION

British Patent Specification No. 2082941 and our European Patent Specification No. 0162650 each relate to a separator, for separating components of a fluid mixture. In particular, these two prior patent specifications relate to devices which are particularly suitable for separating sewage and other solid matter from water in storm water overflows. It is a prime consideration, therefore, in these prior specifications, that the separators should have the highest possible efficiency of separation whereby the clean water which is removed from the top of the vessel has substantially all of the solid material separated therefrom. With these earlier patent specifications, it is always the case that some very fine particles of matter are carried over with the clean water at the top of the vessel.

U.S. Pat. No. 4,146,468 describes a liquid-solid cylindrical separator having a flat base in which solids are separated under the action of gravity and are swept towards a central outlet in the base under the influence of a forced vortex. Liquid is withdrawn from the top of the separator to establish a free vortex in which a relatively light fraction (including floatable material) is concentrated. In contrast with our earlier patent specifications, the device described in U.S. Pat. No. 4,146,468 includes neither a flow modifying member which defines an annular slot with the base nor an annular dip plate for stabilizing flow patterns in the separator.

In the devices the subject of the earlier patent specifications, there are several flow patterns in operation. Firstly, there is a general rotation of fluid in the vessel about the axis of the vessel and, secondly, a toroidal flow generally rising upwardly at the centre of the vessel and moving generally downwardly at the periphery of the vessel. Solid material entering the vessel generally sinks under the action of gravity and is swept toward an outlet at the centre of the base.

In order to achieve efficient separation, it has been found that a flow modifying member, an annular dip plate and a top baffle which restrains material flowing upwardly at the centre from flowing directly out of the vessel, are essential to the efficient running of the device.

SUMMARY OF THE INVENTION

Whilst we have previously appreciated that our device could well be used in the separation of sand and other such particles from an aqueous suspension thereof, we have not previously considered that our device would be useful as a classifying device for classifying particles of material, nor for directly separating an organic component, such as sewage solids from a generally inorganic component such as grit. In order to achieve such classification or separation, it would be necessary to "de-tune" the separator to an extent such that particles below a certain size are not concentrated at the outlet of the base of the vessel but, instead, flow out with the water at the top of the vessel. Such "de-tuning" is not, however, simple and straightforward to achieve because of the delicate balance of forces which are at work in the vessel. Thus, for instance, the separating characteristics of the vessel the subject of our earlier patent specifications can be radically altered by very minor modifications in the vessel and, very often, changes will lead to a shoaling of solids on the base. We have, therefore, investigated the effect of various modifications to the device with a view to establishing a modification which would enable the efficiency of the device to be de-tuned in a controlled manner.

As a result of our investigations, we have established that removal of means obstructing the axial upward flow of liquid carrying solids enables the efficiency of the separator to be de-tuned without affecting the general separating and concentrating ability of the separator, namely the ability of the device to separate material without clogging at the base. It has been found that, by this modification, particles having a settlement velocity below a specific level (but which are not so small as to be insignificant) will be carried out with the liquid flow at the top of the vessel. By suitable modifications of other features of the vessel, such as the shape and size of the flow modifying member, the cylindrical side wall, the inclination of the base and the position of the dip plates, the specific cut-off point at which separation occurs can be adjusted.

The "settlement velocity" of a particle of matter represents its tendency to settle under gravity from an aqueous suspension. A high settlement velocity implies a rapid settlement and a low settlement velocity a slow rate of settlement. For instance, a stone will have a very high settlement velocity whilst a wool fibre will have a low settlement velocity. Using the apparatus of the present invention, separation of solids having high settlement velocitys from those having low settlement velocitys is made possible with a very specific cut off point between the two classes of components. This is particularly useful in classifying particulate material such as inorganic minerals, for example sand or clay.

Thus, in accordance with a first aspect of the present invention, there is provided a separator for operation at low energy levels for classifying a particulate material carried in suspension by a liquid, comprising (a) a vessel having a cylindrical outer wall and a base at one end, (b) a body which is provided within the vessel and which defines with the base an annular opening spaced from the outer wall, (c) an annular dip plate in an upper region of the vessel and spaced from the outer wall of the vessel for stabilising flow patterns in the vessel, (d) an inlet for introducing the liquid carrying the particulate material into the vessel, (e) an outlet in an upper region of the vessel for removing from the vessel liquid carrying a component of the particulate material having a settlement velocity below a predetermined level, (f) a solids collection region centrally disposed of the base for collecting particulate material having a settlement velocity above said predetermined level and (g) means for promoting a rotational movement of the liquid and suspended solids within the vessel, said rotational movement being sufficient to cause or enhance an inward sweeping effect towards the annular opening on solids accumulated at the base of the vessel, whilst being of sufficiently low energy that settlement of the particulate material having a settlement velocity above said predetermined level is brought about primarily by gravity; the arrangement of the separator being such that the liquid carrying particulate material which has a settlement velocity below said predetermined level may flow upwardly to the top of the vessel toward the outlet in a substantially axial direction.

According to a second aspect of the present invention, there is provided a separator for operation at low energy levels for classifying a particulate material carried in suspension by a liquid, comprising (a) a vessel having a cylindrical outer wall and a base at one end, (b) a body which is provided within the vessel and which defines with the base an annular opening spaced from the outer wall, (c) an annular dip plate in an upper region of the vessel and spaced from the outer wall of the vessel for stabilising flow patterns in the vessel, (d) an inlet for introducing the liquid carrying the particulate material into the vessel, (e) an outlet in an upper region of the vessel for removing from the vessel liquid carrying a component of the particulate material having a settlement velocity below a predetermined level, (f) a solids collection region centrally disposed of the base for collecting particulate material having a settlement velocity above said predetermined level and (g) means for promoting a rotational movement of the liquid and suspended solids within the vessel, said rotational movement being sufficient to cause or enhance an inward sweeping effect towards the annular opening on solids accumulated at the base of the vessel, whilst being of sufficiently low energy that settlement of the particulate material having a settlement velocity above said predetermined level is brought about primarily by gravity; wherein the upper region of the vessel is free from any obstruction which would prevent liquid from flowing upwardly to the top of vessel toward the outlet in a substantially axial direction.

In preferred embodiments of the present invention, the separator has no internal baffle at the top of the vessel, in contrast to that described in our prior patent specifications.

The apparatus of the present invention includes an annular dip plate for establishing or stabilising a shear zone between a relatively fast moving region of liquid outward of the dip plate and a relatively slow moving region of liquid inward of the dip plate.

According to a third aspect of the present invention, there is provided a method of separating components of a liquid mixture from each other which comprises:

introducing an aqueous suspension of a solid material into a separator comprising (a) a vessel having a cylindrical outer wall and a base at one end, (b) a body which is provided within the vessel and which defines with the base an annular opening spaced from the outer wall, (c) an annular dip plate in an upper region of the vessel and spaced from the outer wall of the vessel for stabilising flow patterns in the vessel, (d) an inlet for introducing the liquid carrying the particulate material into the vessel, (e) an outlet in an upper region of the vessel for removing from the vessel liquid carrying a component of the particulate material having a settlement velocity below a predetermined level, (f) a solids collection region centrally disposed of the base for collecting particulate material having a settlement velocity above said predetermined level and (g) means for promoting a rotational movement of the liquid and suspended solids within the vessel, the arrangement of the separator being such that the liquid carrying particulate material which has a settlement velocity below said predetermined level may flow upwardly to the top of the vessel toward the outlet in a substantially axial direction;

causing a low energy rotational motion in the vessel; and permitting solids having a settlement velocity above a predetermined level to settle and be concentrated at the solids collection region whilst solids having a settlement velocity below said predetermined size are carried axially to the top of the vessel and out of the vessel through the outlet in the upper region of the vessel.

According to a third aspect of the present invention, there is provided a method of classifying a particulate material which comprises :

introducing an aqueous suspension of a particulate material into a separator comprising (a) a vessel having a cylindrical outer wall and a base at one end, (b) a body which is provided within the vessel and which defines with the base an annular opening spaced from the outer wall, (c) an annular dip plate in an upper region of the vessel and spaced from the outer wall of the vessel for stabilising flow patterns in the vessel, (d) an inlet for introducing the liquid carrying the particulate material into the vessel, (e) an outlet in an upper region of the vessel for removing from the vessel liquid carrying a component of the particulate material having a settlement velocity below a predetermined level, (f) a solids collection region centrally disposed of the base for collecting particulate material having a settlement velocity above said predetermined level and (g) means for promoting a rotational movement of the liquid and suspended solids within the vessel, the arrangement of the vessel being such that liquid may flow upwardly to the top of the vessel towards the outlet in a substantially axially direction;

causing a low energy rotational motion in the vessel; and permitting solids having a size above a predetermined level to settle and be concentrated at the solids collection region whilst particles below said predetermined size are carried axially to the top of the vessel and out of the vessel through the outlet in the upper region of the vessel.

The inlet to the vessel is preferably tangential.

In the apparatus of the present invention, the base slopes downwardly from the outer wall to the solids collection region and takes the form of a truncated inverted cone.

In the method of the present invention, the removal of liquid via the outlet in the upper region of the vessel is achieved without establishing or creating a free vortex in the liquid in the vessel.

BRIEF DESCRIPTION OF THE DRAWINGS

For a better understanding of the present invention and to show how it may be carried into effect, reference will now be made, by way of example, to the accompanying drawings, in which.

DESCRIPTION OF THE PREFERRED EMBODIMENTS

Figure 1:
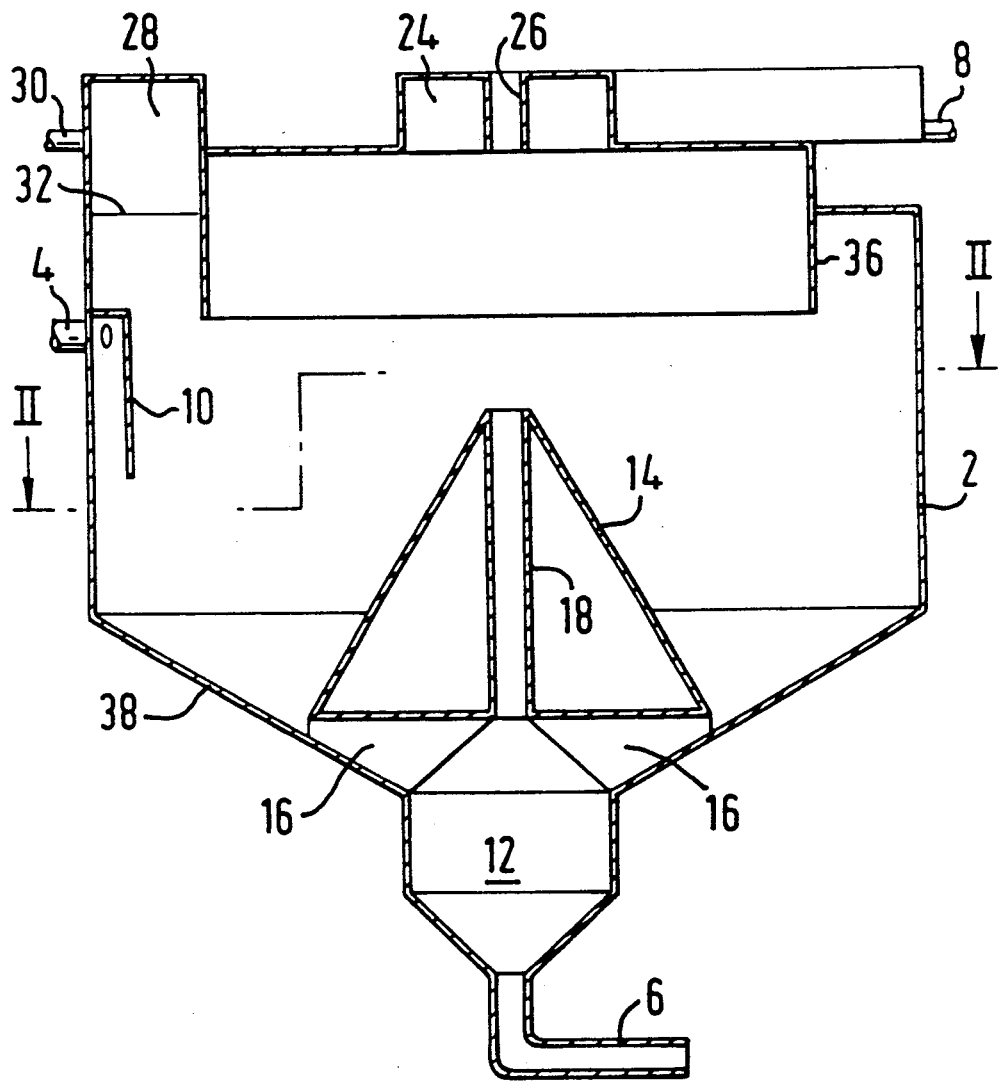
FIG. 1 shows a section through a separator in accordance with the present invention.
Figure 2:
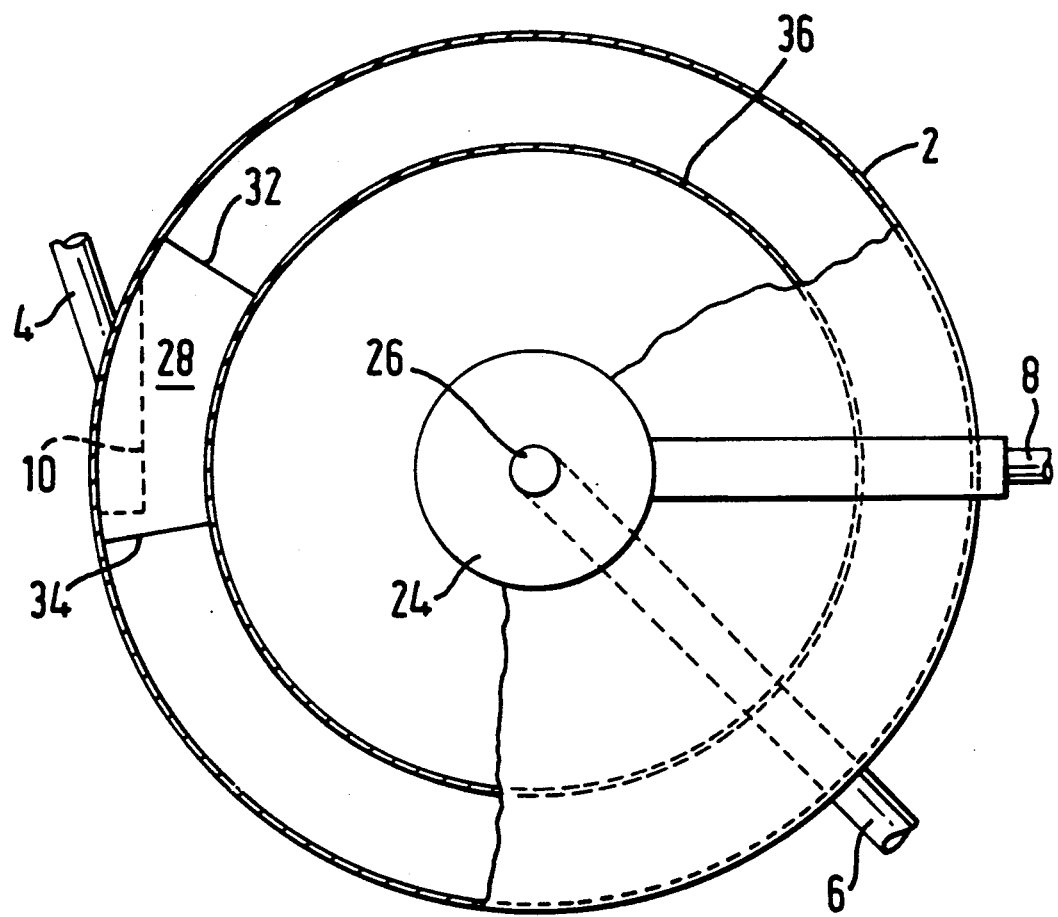
FIG. 2 is a cross-section taken along the line II—II in FIG. 1.

The separator in accordance with the present invention will be described in relation to FIG. 1 and 2. Thus, the separator in accordance with the invention comprises a cylindrical settlement chamber 2 having a tantential inlet 4 and two outlets 6 and 8. The inlet 4 (see particularly FIG. 2), is directed somewhat tangentially so as to promote a circulating flow in chamber 2. This flow may be enhanced by the provision of a further tangential inlet by which energising fluid may be introduced into the vessel, in accordance with European Patent Specification No. 0162650. The circulating effect is enhanced by a deflector plate 10. The flow will circulate about a swirl axis which can be considered to coincide with the central axis of the chamber 2, although fluctuating conditions will mean that this will not always be the case.

The outlet 6 constitutes a solids outlet. As shown in FIG. 1, the bottom wall 38 of the chamber 2 opens into a sump 12, which in turn discharges into the outlet 6. There may be a shut-off valve in the outlet 6. Separated material will be deposited in the sump 12 and may be discharged intermittently. In cases where continuous solids discharge is possible, the sump 12 may be dispensed with.

Above the outlet 6 there is a flow modifying member in the form of a cone 14. The cone 14 is supported on the base of the vortex chamber 2 by support plates 16, the orientation of which is selected so as to direct circulating flow inwardly toward the sump 12. Other arrangements at the base of the chamber 2 are disclosed in European Patent Specification No. 0162650. There is an upwardly extending passage 18 through the cone 14. The vortex angle of the cone 14 is 60 degrees in the embodiment illustrated, and its dimensions are such that the base of the cone 14 terminates at a position approximately half way between the central axis of the chamber 2 and the outer wall. It must be appreciated however, that the shape and dimensions of the cone 14, as well as other components of the separator, will need to be determined empirically for operation under given conditions and in order to achieve the desired separation or classification. The upwardly extending passage 18 is not essential and the cone may be solid, if desired.

Figure 3:
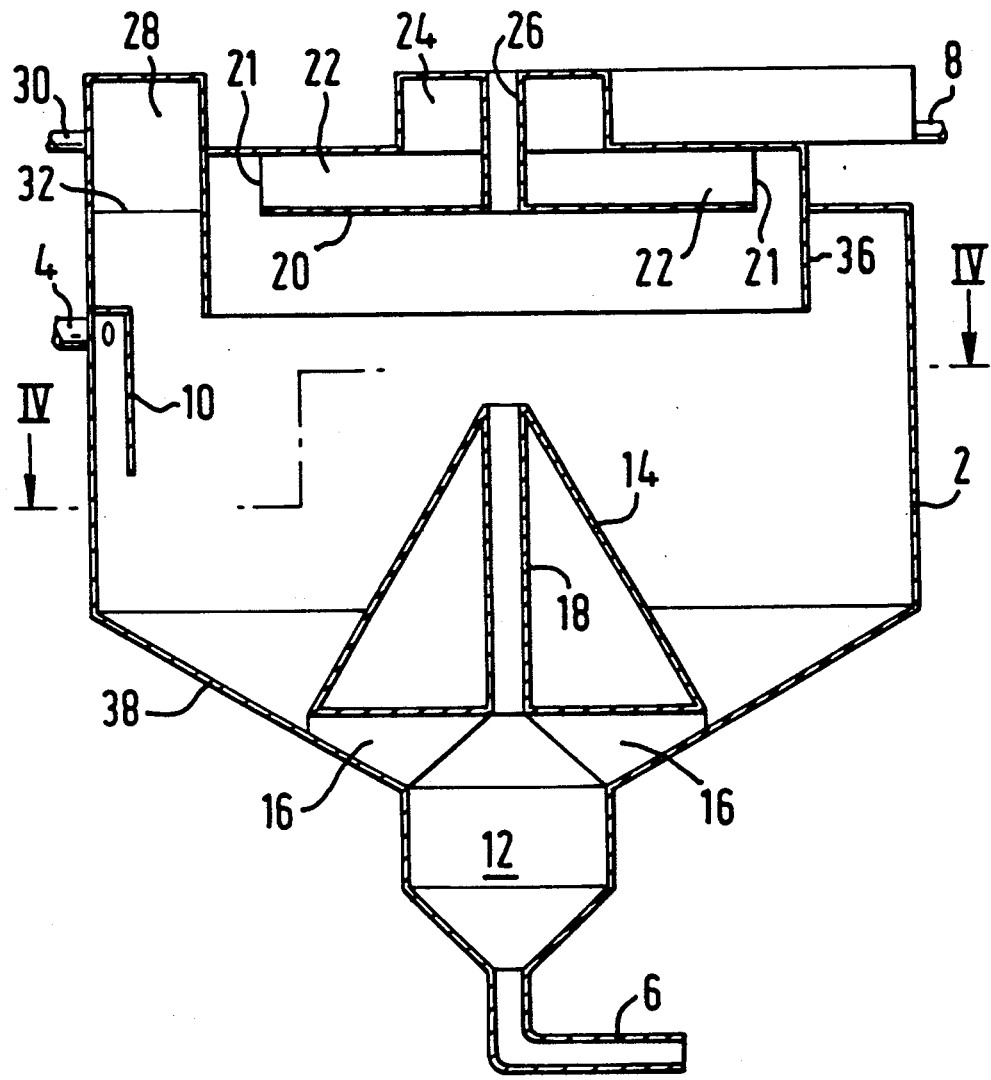
FIG. 3 shows a section through a separator in accordance with our earlier British Patent Specification No. 2082941.
Figure 4:
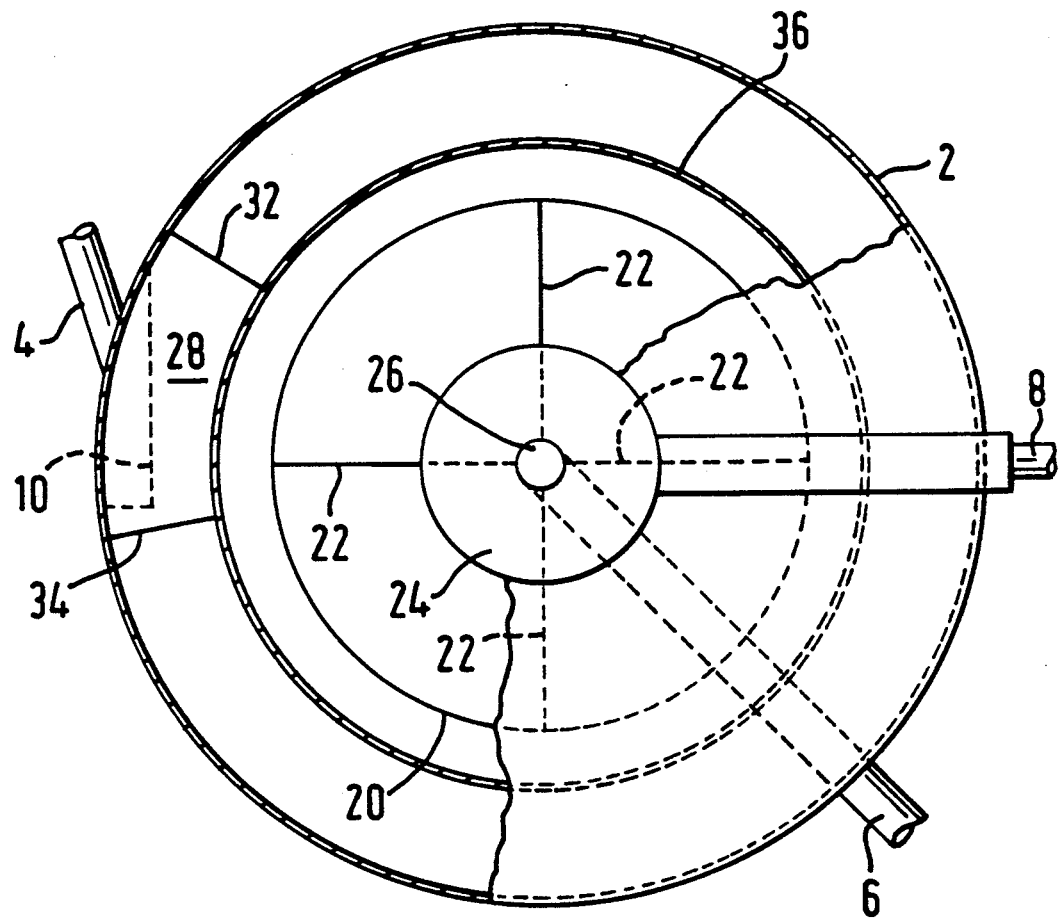
FIG. 4 is a cross-section taken along the line IV—IV in FIG. 3.

It will be noted that, whereas in the prior art separator shown in FIGS. 3 and 4, there is a baffle plate 20 supported by plates 22, these components are absent in the separator of the present invention. Thus, liquid may flow upwardly, generally axially of the vessel to the top of the vessel and toward the outlet 8 without being forced to circulate around the baffle (as shown in FIGS. 3 and 4). The outlet 8 extends from an annular chamber 24, which may or may not be closed at the top. An aperture 26 extends through the chamber 24 to provide access for a cleaning rod which can be passed through the passage 18 and the sump 12 in order to dislodge solid matter which may adhere to these parts.

At the top of the chamber 2 near the outer wall there is a floatables trap 28 and a floatables outlet 30. The floatables trap 28 comprises a bottom wall 32 and an end wall 34, the construction being such that any solid matter floating on the surface of the water in the vortex chamber is carried round in the trap 28, from which it may be discharged through the outlet 30.

An annular dip plate 36 projects downwardly into the chamber 2 from the top wall. As with the dimensions of the cone 14, the position and axial extent of the dip plate 36 must be determined empirically. Its function is to create, or stabilise, a shear zone between an outer, fast-flowing flow and an inner, slower-flowing flow of the mixture in the chamber 2.

In operation as a particle classifying device, a suspension of the material to be classified is passed into the chamber 2 through the inlet 4. This creates a circulating flow in the chamber 2 which separates, with the assistance of the dip plate 36, into the outer and inner flows mentioned above. The flow is such that the majority of non-floatable solid matter progresses down the lower wall 38 of the chamber 2 and between the plates 16. Some matter will, however, be deposited on the outer surface of the cone 14 and the flow will tend to move these deposits slowly up the cone 14. Where the cone has a central passage 18, a secondary, toroidal flow may be established with particulate matter circulating between the plates 16 up through the passageway 18 to rejoin the main flow.

In the device in accordance with the present invention, solid material having a settlement velocity above a predetermined level will settle and accumulate at the base of the device. The other material, having a settlement velocity below the predetermined level will move upwardly directly to the chamber 24 and thereafter to the outlet 8. Any floatable solids which will not be passed to the outlet 6 will be caught in the trap 28 and can then either be mixed with the solids issuing from the outlet 6 or else be disposed of separately.

The construction of the separator results in an efficient classification of solids in the water with a relatively low energy consumption (i.e. requiring only a low pressure head at the inlet 4).

What is claimed is:

1. A separator for operating at low energy levels for classifying a particulate material carried in suspension by a liquid, comprising (a) a vessel having a cylindrical outer wall and a base at one end, (b) a conical body which is provided within the vessel and which defines with the base an annular opening spaced from the outer wall, the lower peripheral edge of said conical body terminating at a position approximately halfway between the central axis of the vessel and said outer wall, (c) an annular dip plate, disposed in an upper region of the vessel, extending downwardly towards said base and spaced from the outer wall of the vessel, for stabilising flow patterns in the vessel, (d) an inlet for introducing the liquid carrying the particulate material into the vessel, (e) an axially unobstructed outlet in an upper region of the vessel interiorly of the annular dip plate for removing from the vessel liquid carrying a component of the particulate material having a settlement velocity below a predetermined level, (f) a solids collection region centrally disposed on the base for collecting particulate material having a settlement velocity above said predetermined level and (g) means for promoting a rotational movement of the liquid and suspended solids within the vessel which is sufficient to cause or enhance an inward sweeping effect towards the annular opening on solids accumulated at the base of the vessel, and which is of sufficiently low energy that settlement of the particulate material having a settlement velocity above said predetermined level is brought about primarily by gravity so as to enable separation of such particulate material with respect for particulate material which has a settlement velocity below said predetermined level; the arrangement of the separator being such that the liquid carrying the particulate material which has a settlement velocity below said predetermined level flows, in use, upwardly to the top of the vessel toward the outlet in a substantially axial direction.

2. A separator for operation at low energy levels for classifying a particulate material carried in suspension by a liquid, comprising (a) a vessel having a cylindrical outer wall and a base at one end, (b) a conical body which is provided within the vessel and which defines with the base an annular opening spaced from the outer wall, the lower peripheral edge of said conical body terminating at a position approximately halfway between the central axis of the vessel and said outer wall, (c) an annular dip plate, disposed in an upper region of the vessel, extending downwardly toward said base, and spaced from the outer wall of the vessel, for stabilising flow patterns in the vessel, (d) an inlet for introducing the liquid carrying the particulate material into the vessel, (e) an outlet in an upper region of the vessel interiorly of the annular dip plate for removing from the vessel liquid carrying a component of the particulate material having a settlement velocity below a predetermined level, (f) a solids collection regions centrally disposed of the base for collecting particulate material having a settlement velocity above said predetermined level and (g) means for promoting a rotational movement of the liquid and suspended solids within the vessel which is sufficient to cause or enhance an inward sweeping effect towards the annular opening on solids accumulated at the base of the vessel, and which is of sufficiently low energy that settlement of the particulate material having a settlement velocity above said predetermined level is brought about primarily by gravity so as to enable separation of said particulate material with respect to particulate material which has a settlement velocity below said predetermined level; the upper region of the vessel being free from any obstruction which would prevent liquid from flowing upwardly to the top of the vessel toward the outlet in a substantially axial direction.

3. A method of classifying suspended solids in a liquid mixture which method comprises:

providing a separator comprising (a) a vessel having a cylindrical outer wall and a base at one end, (b) a conical body which is provided within the vessel and which defines with the base an annular opening spaced from the outer wall the lower peripheral edge of said conical body terminating at a position approximately halfway between the central axis of the vessel and said outer wall, (c) an annular dip plate, disposed in an upper region of the vessel, extending downwardly towards said base, and spaced from the outer wall of the vessel for stabilising flow patterns in the vessel, (d) an inlet for introducing a liquid mixture in which solids are suspended into the vessel, (e) an outlet in an upper region of the vessel interiorly of said annular dip plate for removing from the vessel liquid carrying a component of the solids having a settlement velocity below a predetermined level, (f) a solids collection region centrally disposed of the base for collecting solids having a settlement velocity above said predetermined level and (g) means for promoting a rotational movement of the liquid and suspended solids within the vessel, the arrangement of the vessel being such that liquid flows, in use, upwardly to the top of the vessel towards the outlet in a substantially axially direction;

introducing a liquid suspension of solids into said separator;

causing a low energy rotational motion in the vessel so as to provide separation of the solids essentially as a result of the solids having different settlement velocities; and permitting solids having a settlement velocity above a predetermined level to settle and be concentrated at the solids collection region while solids having a settlement velocity below said predetermined level are carried axially to the top of the vessel and out of the vessel through the outlet in the upper region of the vessel so as to enable classification of said solids based on the settlement velocities thereof.

4. A method of classifying particulate material suspended in a liquid, said method comprising:

providing a separator comprising (a) a vessel having a cylindrical outer wall and a base at one end, (b) a conical body which is provided within the vessel and which defines with the base an annular opening spaced from the outer wall, the lower peripheral edge of said conical body terminating at a position approximately halfway between the central axis of the vessel and said outer wall, (c) an annular dip plate, disposed in an upper region of the vessel, extending downwardly towards said base, and spaced from the outer wall of the vessel for stabilizing flow patterns in the vessel, (d) an inlet for introducing liquid in which particulate material is suspended into the vessel, (e) an outlet in an upper region of the vessel interiorly of said annular dip plate for removing from the vessel liquid carrying a component of the particulate material having a settlement velocity below a predetermined level, (f) a solids collection region centrally disposed of the base for collecting particulate material having a settlement velocity above said predetermined level and (g) means for promoting a rotational movement of the liquid and suspended particulate material within the vessel, the arrangement of the vessel being such that liquid flows, in use, upwardly to the top of the vessel towards the outlet in a substantially axially direction;

introducing a liquid suspension of particulate material into said separator;

causing a low energy rotational motion in the vessel so as to provide separation essentially as a result of different sizes of said particulate material having different settling velocities; and permitting particulate material having a size above a predetermined level to settle and be concentrated at the solids collection region while particulate material below said predetermined size are carried axially to the top of the vessel and out of the vessel through the outlet in the upper region of the vessel so as to enable classification of the particulate material based on the settlement velocities thereof.

5. A method of separating sewage solids from grit suspended with the solids in a liquid mixture, which method comprises:

providing a separator comprising (a) a vessel having a cylindrical outer wall and a base at one end, (b) a conical body which is provided within the vessel and which defines with the base an annular opening spaced from the outer wall, the lower peripheral edge of said conical body terminating at a position approximately halfway between the central axis of the vessel and said outer wall, (c) an annular dip plate, disposed in an upper region of the vessel, extending downwardly towards said base, and spaced from the outer wall of the vessel for stabilizing flow patterns in the vessel, (d) an inlet for introducing sewage solids and grit suspended in a liquid into the vessel, (e) an outlet in an upper region of the vessel interiorly of the annular dip plate for removing from the vessel liquid carrying sewage solids having a settlement velocity below a predetermined level, (f) a solids collection region centrally disposed of the base for collecting grit having a settlement velocity above said predetermined level and (g) means for promoting a rotational movement of the liquid and suspended sewage solids and grit within the vessel, the arrangement of the vessel being such that liquid flows, in use, upwardly to the top of the vessel towards the outlet in a substantially axially direction;

introducing a liquid suspension of sewage solids and grit into said separator;

causing a low energy rotational motion in the vessel so as to provide separation of said sewage solids from said grit essentially as a result of the sewage solids and grit having different settling velocities; and permitting grit having a settlement velocity above a predetermined level to settle and be concentrated at the solids collection region while providing that sewage solids having a settlement velocity below said predetermined level are carried axially directly through the outlet in the upper region of the vessel so as to enable separation of said sewage solids from said grit based on the settlement velocities thereof.

* * * * *